United States Patent
Sohn et al.

(10) Patent No.: US 8,426,550 B2
(45) Date of Patent: Apr. 23, 2013

(54) POLYAMIC ACID, POLYIMIDE, MANUFACTURING METHOD THEREOF, AND POLYIMIDE FILM

(75) Inventors: Byung-Hee Sohn, Yongin-si (KR); Young-Suk Jung, Suwon-si (KR); Yoo-Seong Yang, Giheung-gu (KR); Sang-Mo Kim, Hwaseong-si (KR); Eun-Seog Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 12/831,805

(22) Filed: Jul. 7, 2010

(65) Prior Publication Data

US 2011/0137009 A1 Jun. 9, 2011

(30) Foreign Application Priority Data

Dec. 8, 2009 (KR) ........................ 10-2009-0121467

(51) Int. Cl.
*C07C 219/32* (2006.01)
*C08G 64/40* (2006.01)

(52) U.S. Cl.
USPC ............................ 528/353; 358/350; 358/352

(58) Field of Classification Search ................ 528/350, 528/352, 353
See application file for complete search history.

(56) References Cited

U.S. PATENT DOCUMENTS 4,713,439 A * 12/1987 St. Clair et al. ............... 528/353

FOREIGN PATENT DOCUMENTS

| JP | 1994-200128 A | 7/1994 |
| JP | 1995-101917 A | 4/1995 |
| JP | 1995-192868 A | 7/1995 |
| KR | 10-2007-0089936 A | 9/2007 |

* cited by examiner

*Primary Examiner* — Ana Woodward
(74) *Attorney, Agent, or Firm* — Cantor Colburn LLP

(57) ABSTRACT

A polyamic acid that is a condensation reaction product of one or more acid anhydrides and one or more carbonate-based diamine compounds, along with a polyimide obtained by imidizing the polyamic acid, a method of manufacturing the same, and a polyimide film made therefrom.

21 Claims, 5 Drawing Sheets

POLYAMIC ACID, POLYIMIDE, MANUFACTURING METHOD THEREOF, AND POLYIMIDE FILM

CROSS-REFERENCE TO RELATED APPLICATION

This application claims priority to Korean Patent Application No. 10-2009-0121467 filed on Dec. 8, 2009, the content of which in its entirety is herein incorporated by reference.

BACKGROUND

1. Field

A polyamic acid, a polyimide, a method of manufacturing the same, and a polyimide film prepared from the same are provided.

2. Description of the Related Art

As information technology advances and gains popularity, there is an increasing need for an ultralight flexible thin display that consistently consumes a low amount of electrical power. In order to produce a flexible display, a flexible substrate is required; this substrate is the main determinant of performance, reliability and price of a flexible display.

The flexible substrate may include a plastic material, since plastic has easy workability and low weight, and is good for a continuous process. Plastic, however, exhibits low thermal stability. For example, common polyimide films fail to retain their color, and often turn yellow or brown due to heat degradation as a result of a severe thermal history or due to the polymer structure. Such color degradation is generally due to formation of a charge-transfer (CT) complex within or between polymer molecules. This CT complex consists of an electron-giving part, in which a nitrogen atom centers inside the polymer, and an electron-receiving part, in which a carbonyl group centers inside the polymer.

In addition to thermal stability, other properties that are advantageous for a substrate material include a low coefficient of thermal expansion ("CTE") and high light transmission. In addition, if the plastic substrate is used for an LCD, a lower phase-retardation ("Ro") is required, in order to achieve wider viewing angles.

Accordingly, there is a need for a polyimide polymer having improved heat resistance, optionally together with other advantageous properties for use in display substrate materials.

SUMMARY

In certain embodiments, a polyamic acid and a polyimide having improved light transmission, thermal properties, and phase-retardation properties are disclosed. In further embodiments, this disclosure provides a method of manufacturing the polyamic acid and polyimide, and a polyimide film including the same.

According to an embodiment, a polyamic acid is provided that comprises a condensation reaction product of one or more carbonate-based diamine compounds represented by the following Chemical Formula 1, and one or more acid anhydrides.

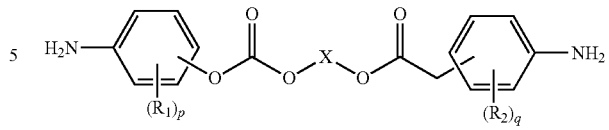

Chemical Formula 1

In the above Chemical Formula 1, X is a divalent aromatic group represented by the following Chemical Formula 1A or a substituted or unsubstituted divalent $C_5$ to $C_{30}$ alicyclic group, $R_1$ and $R_2$ are independently hydrogen, a $C_1$ to $C_{10}$ alkyl group, or a $C_1$ to $C_{10}$ fluoroalkyl group, and p and q independently range from 0 to 3, and specifically, each p and q is 0.

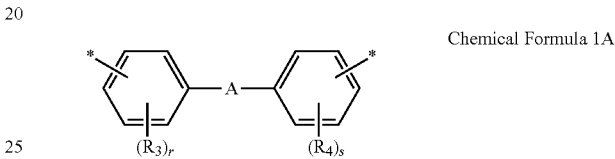

Chemical Formula 1A

In the above Chemical Formula 1A, each asterisk ("*") represents a point of attachment to an adjacent oxygen atom, A is a single bond, CRR' (where R and R' are independently hydrogen, a $C_1$ to $C_{10}$ alkyl group, or a $C_1$ to $C_{10}$ fluoroalkyl group), $SO_2$, O, or CO, each $R_3$ and $R_4$ is independently hydrogen, a $C_1$ to $C_{10}$ alkyl group, or a $C_1$ to $C_{10}$ fluoroalkyl group, and r and s independently range from 0 to 3, and specifically, each r and s is 0.

In certain representative embodiments, X of the above Chemical Formula 1 is selected from the following Chemical Formulae 1B, in which each asterisk ("*") represents a point of attachment to an adjacent oxygen atom.

Chemical Formulae 1B

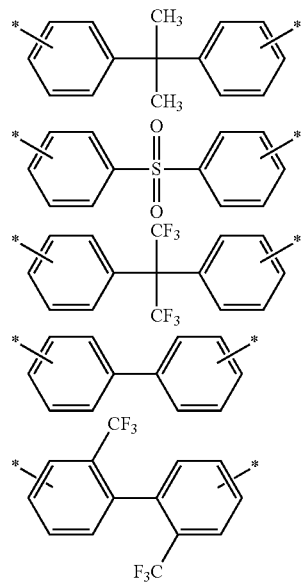

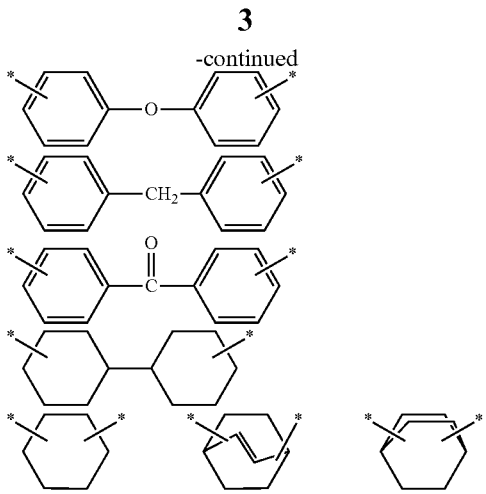

In further representative embodiments, the polyamic acid may be a compound represented by the following Chemical Formula 6.

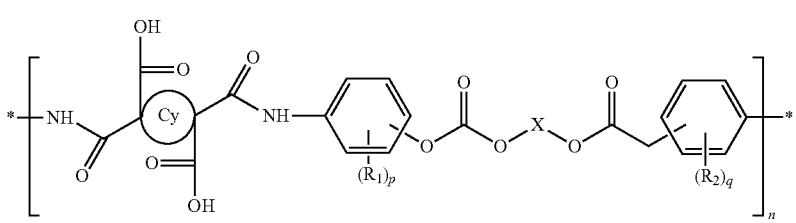

In the above Chemical Formula 6, each asterisk ("*") represents a point of attachment to an adjacent polymer unit (if present), n ranges from 1 to about 500,000, X, $R_1$, $R_2$, p, and q are the same as in Chemical Formula 1, and Cy is a trivalent or tetravalent organic group selected from a substituted or unsubstituted $C_4$ to $C_{20}$ carbon cyclic group, a substituted or unsubstituted $C_6$ to $C_{20}$ monocyclic aromatic group, a substituted or unsubstituted $C_2$ to $C_{20}$ condensed polycyclic aromatic group, a substituted or unsubstituted $C_2$ to $C_{20}$ non-condensed polycyclic aromatic group, and a group that contains two substituted or unsubstituted $C_2$ to $C_{20}$ non-condensed polycyclic aromatic groups that are linked to each other through a substituted or unsubstituted aromatic group, as illustrated below:

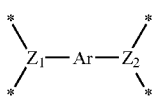

wherein Ar is a substituted or unsubstituted aromatic group, and $Z_1$ and $Z_2$ are independently chosen from $C_2$ to $C_{20}$ non-condensed polycyclic groups as defined above.

According to still another embodiment, a polyimide is provided that is produced through condensation of at least one carbonate-based diamine compound represented by the following Chemical Formula 1 and at least one acid anhydride to form a polyamic acid, and the subsequent imidization of the polyamic acid.

Chemical Formula 1

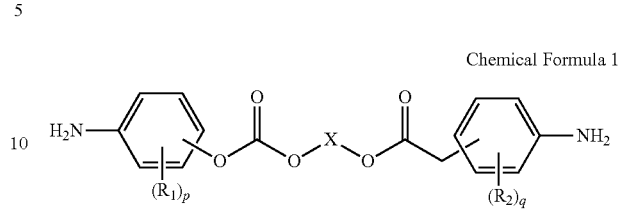

In the above Chemical Formula 1, X is a divalent aromatic group represented by the following Chemical Formula 1A, or a substituted or unsubstituted divalent $C_5$ to $C_{30}$ alicyclic group, $R_1$ and $R_2$ are independently hydrogen, a $C_1$ to $C_{10}$ alkyl group, or a $C_1$ to $C_{10}$ fluoroalkyl group, and p and q independently range from 0 to 3, and specifically, each p and q is 0.

Chemical Formula 1A

In the above Chemical Formula 1A, each asterisk ("*") represents a point of attachment to an adjacent oxygen atom, A is a single bond, CRR' (where R and R' are hydrogen, a $C_1$ to $C_{10}$ alkyl group, or a $C_1$ to $C_{10}$ fluoroalkyl group), $SO_2$, O, or CO.

each $R_3$ and $R_4$ is independently hydrogen, a $C_1$ to $C_{10}$ alkyl group, or a $C_1$ to $C_{10}$ fluoroalkyl group, and r and s independently range from 0 to 3, and specifically, each r and s is 0.

X of the above Chemical Formula 1 may, in certain embodiments, be selected from the following Chemical Formulae 1B, in which each asterisk ("*") represents a point of attachment to an adjacent oxygen atom.

Chemical Formulae 1B

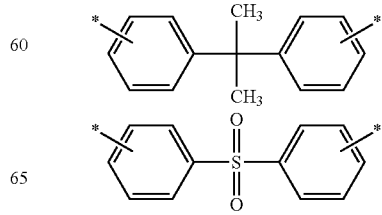

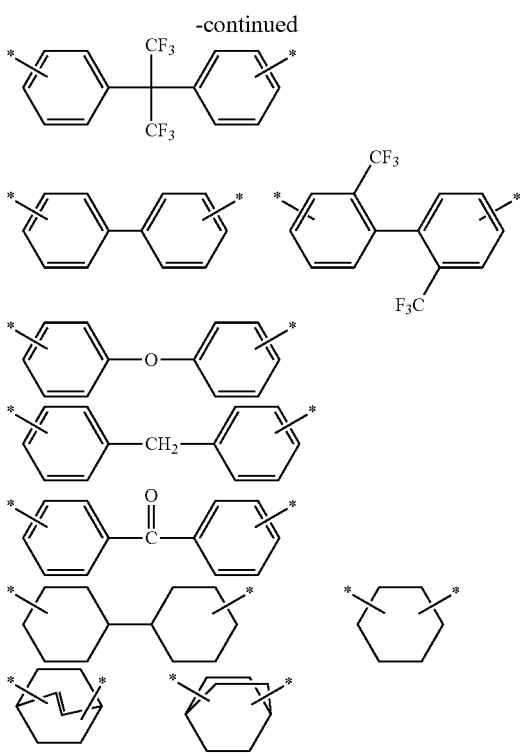

The polyimide may, within certain embodiments, be a compound represented by the following Chemical Formula 7 or 8.

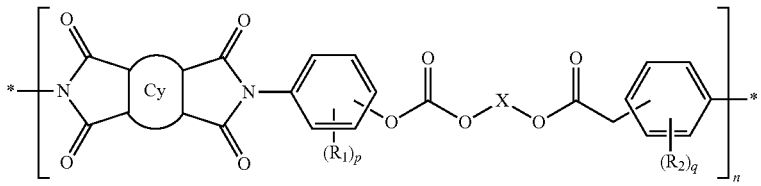

Chemical Formula 7

In the above Chemical Formula 7, each asterisk ("*") represents a point of attachment to an adjacent polymer unit (if present), n ranges from 1 to about 500,000, X, $R_1$, $R_2$, p, and q are the same as in Chemical Formula 1, and Cy is as described above.

In yet another embodiment, a method of manufacturing a polyimide is provided that includes preparing polyamic acid by reacting at least one carbonate-based diamine compound represented by the above Chemical Formula 1 and at least one acid anhydride, and imidizing the polyamic acid.

In further embodiments, a polyimide film including the polyimide is provided.

DETAILED DESCRIPTION

Figure 1:
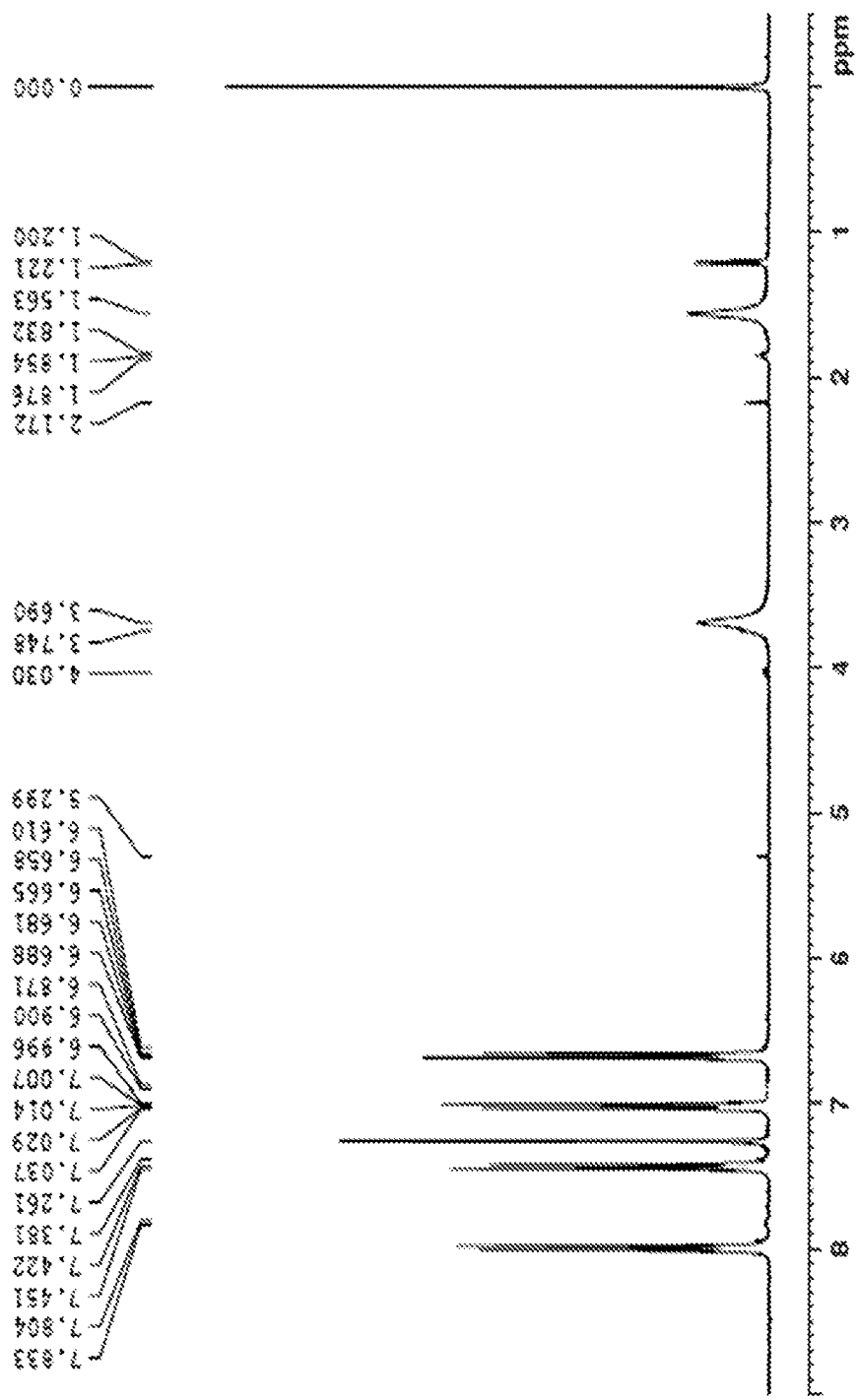
FIG. 1 shows a $^1$H-NMR spectrum of bis(4-aminophenyl) 4,4'-sulfonylbis(4,1-phenylene)dicarbonate ("DACP-S") diamine monomer prepared according to Synthesis Example 1.

The invention is described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

As used herein, the terms "a" and "an" are open terms that may be used in conjunction with singular items or with plural items. It will be further understood that the terms "comprises" and/or "comprising," when used in this specification, specify

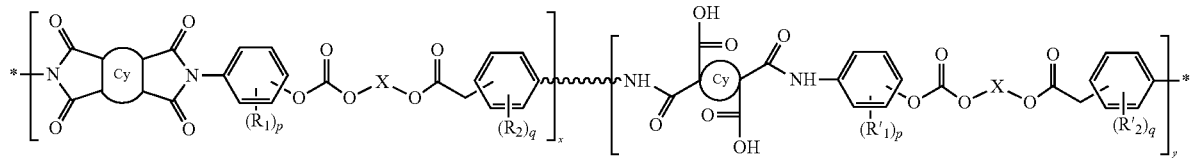

Chemical Formula 8

In the above Chemical Formula 7, each asterisk ("*") represents a point of attachment to an adjacent polymer unit (if present), n (the sum of x and y) ranges from 1 to about 500,000, x and y are mole ratios wherein x:y ranges from about 0.01:99.99 to about 99.99:0.01, X, $R_1$, $R_2$, p, and q are the same as in Chemical Formula 1, $R'_1$ and $R'_2$ are the same the presence of stated features, regions, integers, steps, operations, elements and/or components, but do not preclude the presence or addition of one or more other features, regions, integers, steps, operations, elements, components and/or groups thereof. All ranges and endpoints reciting the same feature are independently combinable.

As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to an exemplary embodiment, provided are a polyamic acid and a polyimide having improved light transmission characteristic, thermal properties, and phase-retardation properties. Such polyamic acid and polyimide may be prepared by reacting one or more carbonate-based diamines with one or more acid anhydrides. In certain representative embodiments, one carbonate-base diamine is reacted with one acid anhydride (i.e., all acid anhydride molecules have an identical structure and all diamine molecules have an identical structure). Within further representative embodiments, a mixture of different acid anhydrides and/or diamines may be used. For example, from 1 to 4 acid anhydrides may be reacted with from 1 to 4 carbonate-based diamines.

A carbonate-based diamine includes a carbonate functional group as part of the diamine and thus provides a carbonate functionality to the polyimide upon reaction with an acid anhydride to form the polyimide. The resulting polyimide has durability and impact resistance similar to polycarbonate resin ("PC"), and also exhibits excellent thermal properties and transparency.

Hereinafter, a process of manufacturing a polyamic acid and a polyimide according to an exemplary embodiment is provided.

In the process, one or more carbonate-based diamines represented by the following Chemical Formula 1 and one or more acid anhydride, in an organic solvent, are reacted at a temperature ranging from about 0° C. to about 200° C., preparing a polyamic acid.

Chemical Formula 1

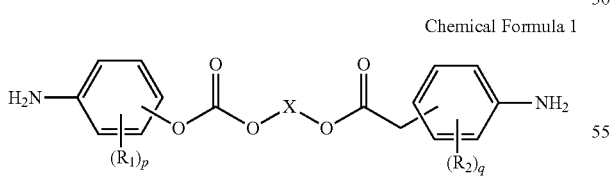

In the above Chemical Formula 1,

X is a divalent aromatic group represented by the following Chemical Formula 1A, or a substituted or unsubstituted divalent $C_5$ to $C_{30}$ alicyclic group, $R_1$ and $R_2$ are independently hydrogen, a $C_1$ to $C_{10}$ alkyl group, or a $C_1$ to $C_{10}$ fluoroalkyl group, and p and q independently range from 0 to 3, and specifically, each p and q is 0.

Chemical Formula 1A

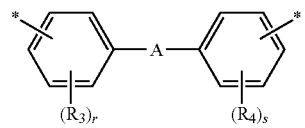

In the above Chemical Formula 1A, each asterisk ("*") represents a point of attachment to an adjacent oxygen atom, A is a single bond, CRR' (where R and R' are hydrogen, a $C_1$ to $C_{10}$ alkyl group, or a $C_1$ to $C_{10}$ fluoroalkyl group), $SO_2$, O, or CO. It will be apparent that more than one carbonate based diamine that satisfies Chemical Formula 1 may be used in the preparation of a polyamic acid; accordingly the elements represented by variables (e.g., X, $R_1$, $R_2$, p and q) may, but need not, vary within any particular polyamic acid. For example, multiple "A" moieties may exist within a particular polyamic acid, and variability may also be seen in the to number and type of ring substituents.

Also within Chemical Formula 1A, each $R_3$ and $R_4$ is independently hydrogen, a $C_1$ to $C_{10}$ alkyl group, or a $C_1$ to $C_{10}$ fluoroalkyl group, and each r and s independently ranges from 0 to 3, and specifically, each r and s is 0.

Within certain representative embodiments, X of the above Chemical Formula 1 is selected from the following Chemical Formulae 1B, wherein each asterisk ("*") represents a point of attachment to an adjacent oxygen atom.

Chemical Formulae 1B

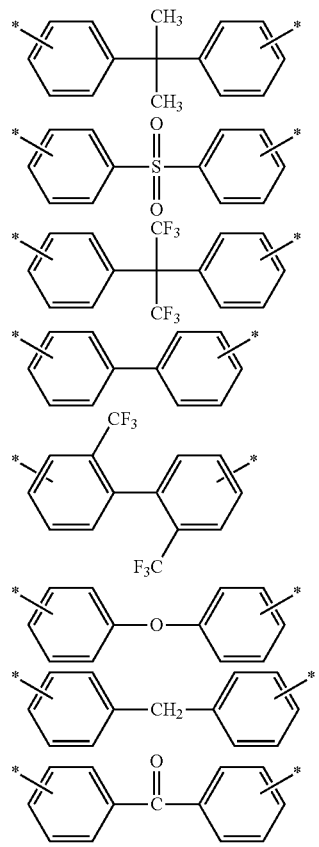

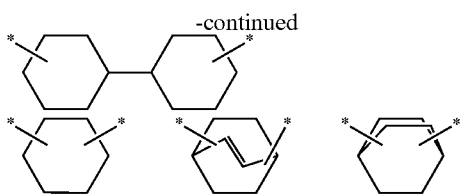

In certain embodiments at least one acid anhydride may be a compound represented by the following Chemical Formula 2.

Chemical Formula 2

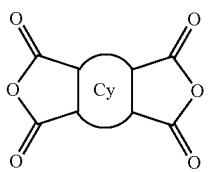

In the above Chemical Formula 2, Cy is a trivalent or a tetravalent organic group selected from a substituted or unsubstituted $C_4$ to $C_{20}$ carbon cyclic group, a substituted or unsubstituted $C_6$ to $C_{20}$ monocyclic aromatic group, a substituted or unsubstituted $C_2$ to $C_{20}$ condensed polycyclic aromatic group, and a substituted or unsubstituted $C_2$ to $C_{20}$ non-condensed polycyclic aromatic group. Alternatively, Cy may contain two substituted or unsubstituted $C_2$ to $C_{20}$ non-condensed polycyclic aromatic groups that are linked to each other through a substituted or unsubstituted aromatic group, as illustrated below:

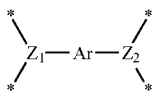

wherein Ar is a substituted or unsubstituted aromatic group, and $Z_1$ and $Z_2$ are independently chosen from $C_2$ to $C_{20}$ non-condensed polycyclic groups as defined above.

Examples of acid anhydrides include, but are not limited to, 4,4-biphthalic anhydride ("BPDA"), 3,3',4,4'-diphenylsulfone tetracarboxylic dianhydride ("DSDA"), 3,3',4,4'-benzophenonetetracarboxylic dianhydride ("BTDA"), 4,4'-(hexafluoroisopropylidene)diphthalic anhydride ("6FDA"), 4,4'-oxydiphthalic anhydride ("ODPA"), pyromellitic dianhydride ("PMDA"), 4-(2,5-dioxotetrahydrofuran-3-yl)-1,2,3,4-tetrahydronaphthalene-1,2-dicarboxylic anhydride ("DTDA"), and the like. These may be used singularly or in a mixture of two or more. These acid anhydrides may be represented by the following Chemical Formulae 2A.

Chemical Formulae 2A

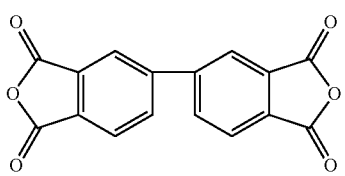
BPDA

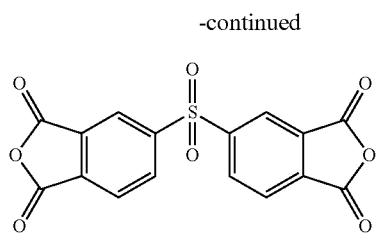
DSDA

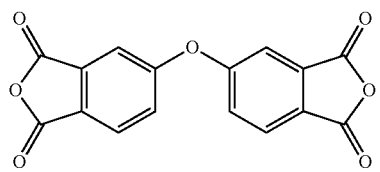
BTDA

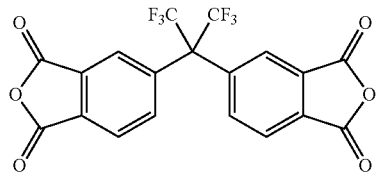
6FDA

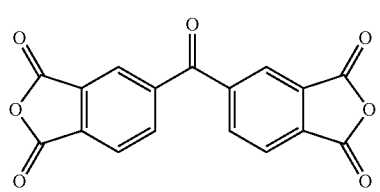
ODPA

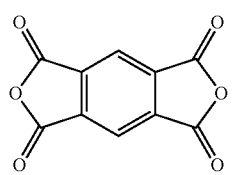
PMDA

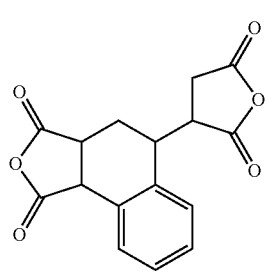
DTDA

Representative organic solvents include, for example, N-methylpyrrolidone, N,N-dimethyl formamide, N,N-diethylformamide, N,N-dimethyl acetamide, N-methylcaprolactam, N-methyl propionamide, dimethylsulfoxide, pyridine, tetrahydrofuran, cyclohexanone, 1,4-dioxane, and other polar aprotic solvents. Such solvents may be used singularly or in a mixture of two or more.

An acid anhydride represented by the above Chemical Formula 2 may, in certain embodiments, be controlled to have a concentration ranging from about 5 to about 95 parts by weight based on 100 parts by weight of the organic solvent. When the acid anhydride is used within this range, a film may be fabricated to have a desired property and better workability.

The one or more acid anhydrides are added to a solution comprising one or more diamines in a polar aprotic solvent.

In certain embodiments, at least one diamine is a carbonate-based diamine represented by the above Chemical Formula 1, which may be included in an amount ranging from about 0.5 mol to about 1.5 mol based on 1 mol of the acid anhydride represented by the above Chemical Formula 2. When the diamine of Chemical Formula 1 is included within this range, properties of the polyamic acid and polyimide may be improved.

The polyamic acid may be obtained from a reaction at, for example, a temperature ranging from about 0° C. to about 200° C. When the reaction temperature is within this range, reactivity of the reaction to obtain polyamic acid may be readily controlled within a desired range to yield a final polymer product with a desired molecular weight.

In certain embodiments, the polyamic acid is imidized to obtain a desired polyimide. The imidization may be performed using either a chemical or a thermal reaction. According to an exemplary embodiment, thermal imidization may be used.

The thermal imidization may, for example, be performed at a temperature ranging from about 100° C. to about 400° C. in another embodiment, the temperature ranges from about 200° C. to about 300° C. and in still another embodiment, the temperature is about 250° C. When the heat treatment is performed within this temperature range, the imidization reactivity may be controlled within a desired range, minimizing non-reacted polyamic acid and improving optical characteristics of the prepared polyamic acid.

A carbonate-based diamine compound according to an embodiment may be bis(4-aminophenyl) 4,4'-(propan-2,2-diyl) bis(4,1-phenylene)dicarbonate ("DACP-IP") represented by the following Chemical Formula 3.

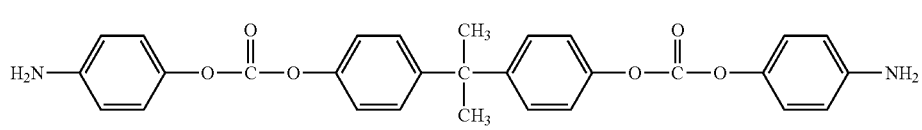

Chemical Formula 3

A carbonate-based diamine compound according to an embodiment may be bis(4-aminophenyl) 4,4'-sulfonyl bis(4,1-phenylene)dicarbonate ("DACP-S") represented by the following Chemical Formula 4.

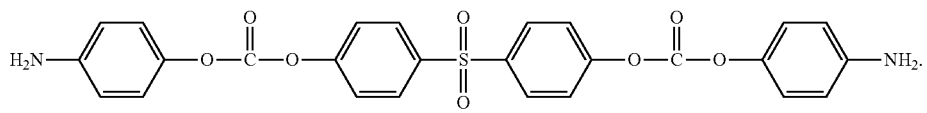

Chemical Formula 4

The polyamic acid according to an embodiment may be a compound represented by the following Chemical Formula 5.

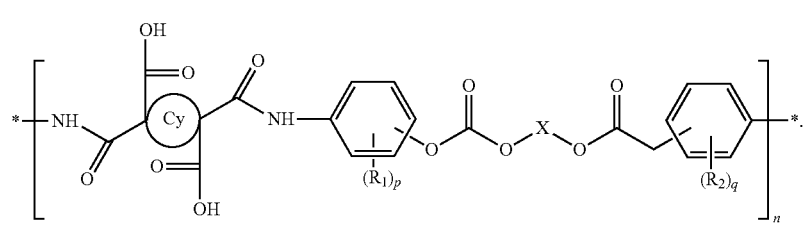

Chemical Formula 5

In the above Chemical Formula 5, n ranges from 1 to about 500,000, X, $R_1$, $R_2$, p, and q are the same as in Chemical Formula 1, and Cy is the same as in Chemical Formula 2.

The polyimide according to an embodiment may be a compound represented by the following Chemical Formula 6.

Chemical Formula 6

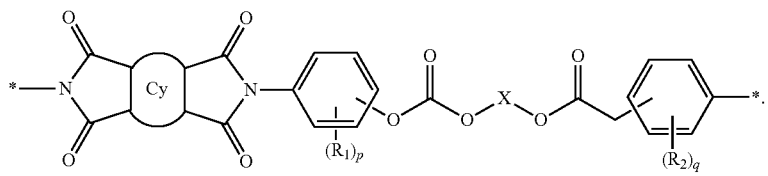

In the above Chemical Formula 6, n ranges from 1 to about 500,000, X, $R_1$, $R_2$, p, and q are the same as in Chemical Formula 1, and Cy is the same as in Chemical Formula 2.

The polyimide according to another embodiment may be a compound represented by the following Chemical Formula 7.

Chemical Formula 7

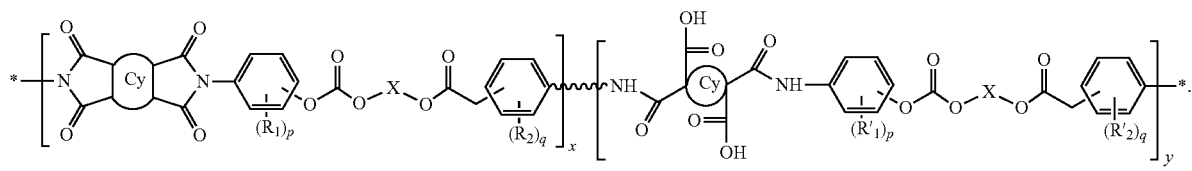

In the above Chemical Formula 7, n (the sum of x and y) ranges from 1 to about 500,000, x and y are mole ratios wherein x:y ranges from about 0.01:99.99 to about 99.99:0.01, X, $R_1$, $R_2$, p, and q are the same as in Chemical Formula 1, $R'_1$ and $R'_2$ are the same as $R_1$ and $R_2$ defined in Chemical Formula 1, and Cy is the same as in Chemical Formula 2.

The weight average molecular weight of the polyimide according to an embodiment is measured using gel permeation chromatography ("GPC"), with dimethyl formamide ("DMF") as a diluting agent. Certain representative polyimides have a weight average molecular weight ranging from about 10,000 to about 2,000,000, and in another embodiment, from about 50,000 to about 1,000,000. When it has a weight average molecular weight within this range, the polyimide generally exhibits easy workability and can be readily used within a continuous process.

A polyimide as described above may be used, according to an exemplary embodiment, to fabricate a polyimide film. The polyimide film may, for example, have a thickness ranging from about 10 μm to about 200 μm, and it may be transparent.

According to another embodiment, a polyimide film may have average transmission of about 80% or more when it is 380 nm to 800 nm thick, and for example, average transmission of about 85% to about 90% or more with a thickness ranging from about 10 μm to about 200 μm. Transmission is typically measured using a UV spectrometer.

According to an embodiment, a polyimide film may have a yellow index ("YI") of about 15 or less, and for example, ranging from about 0.01 to about 5 with a thickness ranging from about 10 μm to about 200 μm.

In addition, a polyimide film according to an exemplary embodiment may have an average coefficient of thermal expansion of about 100 ppm/° C. or less, and for example, from about 3 ppm/° C. to about 80 ppm/° C., at a temperature ranging from about 50° C. to about 200° C. with a thickness ranging from about 10 μm to about 200 μm.

According to an embodiment, a polyimide film may have phase-retardation of about 5 nm or less.

Accordingly, a polyimide film according to an embodiment has excellent thermal stability, electrical properties, and mechanical properties as well as transparency, and thus may be used for an optical film, a compensation film of a liquid crystal display ("LCD") and an organic light emitting diode, an alignment layer of an LCD, a waveguide material, a protective layer for a solar cell, a radio frequency identification ("RFID") substrate, or a protective layer for other devices.

Since a polyimide film according to an exemplary embodiment has improved phase-retardation properties, it may particularly be usefully applied to an optical film and an LCD.

Each of the terms used in chemical formulae of the specification is defined as follows.

"Alkyl" refers to refers to a straight or branched chain saturated aliphatic hydrocarbon. Alkyl groups include, for example, groups having from 1 to 50 carbon atoms (C1-C50 alkyl).

"Fluoroalkyl" refers to an alkyl group in which at least one hydrogen is replaced with fluorine.

A "$C_4$ to $C_{20}$ carbon cyclic group" is a group that comprises a single or multiple rings containing a total of 4 to 20 carbon atoms, and no non-carbon ring atoms. The rings can be aliphatic or aromatic, or if multiple rings are present, a combination of aliphatic and aromatic rings can be present. If multiple rings are present, such rings may be fused, pendant, or spiro and may optionally be linked via an —S—, —S(O)—, —SO$_2$— or —O— linker, or via a substituted or unsubstituted methylene moiety (e.g., —C(O)— or a carbon substituted with two fluoroalkyl groups). A carbon cyclic group may have one or more independently chosen substituents such as a halogen, a haloalkyl group, a nitro group, a cyano group, an alkoxy group, and a lower alkylamino group, wherein each alkyl has for example, 1 to 4 carbon atoms.

A "$C_2$ to $C_{20}$ monocyclic aromatic group" is a $C_2$ to $C_{20}$ aromatic system including one aromatic ring. The aromatic ring may be a carbocycle or a heterocycle. One or more hydrogen atoms present in a monocyclic aromatic group may be replaced with a substituent as discussed above for the $C_4$ to $C_{20}$ carbon cyclic groups.

A "$C_2$ to $C_{20}$ condensed polycyclic aromatic group" is a group that comprises at least two rings, all of which rings are aromatic, with a total of from 2 to 20 carbon ring members, and optionally further including one or more additional non-carbon ring members, such that the rings are condensed with one another. One or more hydrogen atoms present in a condensed polycyclic aromatic group may be replaced with a substituent as discussed above for the $C_4$ to $C_{20}$ carbon cyclic groups.

A "$C_2$ to $C_{20}$ non-condensed polycyclic aromatic group" is an aromatic system including at least two aromatic rings linked to one another directly or by a linker, such that the total number of ring carbon atoms ranges from 2 to 20. It will be apparent that additional non-carbon ring members may also be present. The linker can be a C1 to C8 aliphatic group, a substituted or unsubstituted methylene moiety (e.g., —C(O)— or a carbon substituted with two fluoroalkyl groups), a $C_6$ to $C_{12}$, aromatic group, or a functional group such as an —S—, —S(O)—, —SO$_2$— or —O—. One or more hydrogen atoms present in a $C_2$ to $C_{20}$ non-condensed polycyclic aromatic group may be replaced with a substituent as discussed above for $C_4$ to $C_{20}$ carbon cyclic groups.

As used herein, the term "alicyclic group" refers to a $C_5$ to $C_{30}$ cycloalkyl group, a $C_5$ to $C_{30}$ cycloalkenyl group, or a $C_5$ to $C_{30}$ cycloalkynyl group.

As used herein, when a definition is not otherwise provided, the term "substituted" refers to one substituted with one or more (e.g., 1, 2, 3, 4 or 5) substituents independently selected from a halogen, a haloalkyl group, a nitro group, a cyano group, an alkoxy group, and a lower alkylamino group.

Hereinafter, the embodiments are illustrated in more detail with reference to examples. However, the following examples are exemplary embodiments and are not limiting.

SYNTHESIS EXAMPLE 1

Carbonate-based diamine ("DACP-S")

SYNTHESIS EXAMPLE 1-1

Synthesis of bis(4-nitrophenyl)4,4'-thiobis(4,1-phenylene)dicarbonate 10 mmol (2.18 g) of 4,4'-thiophenol is dissolved in 50 ml of tetrahydrofuran ("THF") and 2.1 eq. (2.4 g) of potassium-t-butoxide is slowly added to the solution. The resulting mixture is agitated at room temperature for 30 minutes, and a solution prepared by dissolving 2.1 eq. (4.23 g) of 4-nitrophenylchloroformate in 20 ml of THF is slowly injected thereto. The resulting mixture is reacted at room temperature for 18 hours. When the reaction is complete, 100 ml of distilled water is added thereto. The resulting product is extracted with 100 ml of ethyl acetate and then washed three times with distilled water. Then, the solvent is removed under reduced pressure distillation. The concentrated product is separated by column chromatography using an eluting solvent including hexane and ethyl acetate in a volume ratio of 5:1, yielding 3.28 g of bis(4-nitrophenyl) 4,4'-thiobis(4,1-phenylene)dicarbonate.

SYNTHESIS EXAMPLE 1-2

Synthesis of bis(4-nitrophenyl)4,4'-sulfonylbis(4,1-phenylene)dicarbonate 12.0 mmol (7.4 g) of oxone is dissolved in 50 ml of distilled water and cooled to below 5° C. Next, 3.28 g of bis(4-nitrophenyl) 4,4'-thiobis(4,1-phenylene)dicarbonate prepared in Synthesis Example 1-1 is dissolved in 20 ml of methanol. The solution is slowly added to the above product over 15 minutes, and then agitated for 1 hour. After the agitation, the reaction mixture is extracted with 100 ml of methylene chloride under reduced pressure distillation to remove the solvent, and then recrystallized with 30 ml of 2-butanone, yielding 2.5 g of bis(4-nitrophenyl)4,4'-sulfonylbis(4,1-phenylene)dicarbonate.

SYNTHESIS EXAMPLE 1-3

Synthesis of bis(4-aminophenyl)4,4'-sulfonylbis(4,1-phenylene)dicarbonate ("DACP-S")

2.5 g of bis(4-nitrophenyl)4,4'-sulfonylbis(4,1-phenylene) dicarbonate according to Synthesis Example 1-2 is dissolved in 50 ml of THF. One gram of Pd/C is added thereto, and hydrogen gas is injected thereto at a pressure of about 1.5 atm to about 2 atm, although lower or higher pressures may also be used. The resulting product is agitated for 12 hours. When the reaction is complete, a Celite filter is used to remove the Pd/C. The resulting product is filtered again with the Celite filter, which is used after washing. The resulting solution is vaporized under reduced pressure distillation. The product is recrystallized with methanol, yielding 1.8 g of bis(4-aminophenyl)4,4'-sulfonylbis(4,1-phenylene)dicarbonate represented by the following Chemical Formula 4.

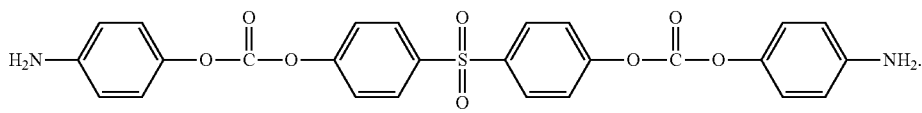

Chemical Formula 4

The final compound is identified regarding the chemical structure with Bruker NMR spectroscopy. Its spectrum is provided in FIG. 1.

$^1$H-NMR (300 MHz, CDCl$_3$): (ppm) 7.83-7.80 (d, 4H, ArH), 7.45-7.38 (d, 4H, ArH), 7.03-7.00 (d, 4H, ArH), 6.68-6.61 (d, 4H, ArH), 3.69 (s, 4H, —NH$_2$).

SYNTHESIS EXAMPLE 2

Carbonate-based diamine ("DACP-IP")

SYNTHESIS EXAMPLE 2-1

Synthesis of bis(4-nitrophenyl)4,4'-(propan-2,2-diyl) bis(4,1-phenylene)dicarbonate 10 mmol (2.28 g) of 4,4'(propan-2,2'-diyl)diphenol is dissolved in 50 ml of THF and 2.1 eq. (2.4 g) of potassium-t-butoxide is slowly added thereto. The resulting product is agitated at room temperature for 30 minutes, whereupon a solution prepared by dissolving 2.1 eq. (4.23 g) of 4-nitrophenylchloroformate in 20 ml of THF is slowly injected thereto. The reaction is allowed to proceed at room temperature for 18 hours. When the reaction is complete, 100 ml of distilled water is added thereto. The resulting reactant is extracted with 100 ml of ethyl acetate and then washed three times with distilled water. Next, the solvent is removed under reduced pressure distillation. The concentrated product is separated by column chromatography with an eluting solvent including hexane and ethyl acetate in a volume ratio of 5:1, to yield 3.94 g of bis(4-nitrophenyl)4,4'-(propan-2,2-diyl)bis(4,1-phenylene)dicarbonate.

SYNTHESIS EXAMPLE 2-2

Synthesis of bis(4-aminophenyl)4,4'-(propan-2,2-diyl) bis(4,1-phenylene)dicarbonate ("DACP-IP")

2.5 g of bis(4-nitrophenyl)4,4'-(propan-2,2-diyl)bis(4,1-phenylene)dicarbonate according to Synthesis Example 2-1 is dissolved in 50 ml of THF, and then 1 g of Pd/C is added thereto and hydrogen gas is injected thereto at a pressure of about 1.5 atm to about 2 atm, although lower or higher pressures may also be used. The resulting mixture is agitated for 12 hours. When the reaction is complete, a Celite filter is used to remove the Pd/C. The Celite filter is washed with THF again and filtered. The resulting solution is distilled under reduced pressure. The product is recrystallized with methanol, preparing 1.95 of bis(4-aminophenyl)4,4'-(propan-2,2-diyl)bis(4,1-phenylene)dicarbonate represented by the following Chemical Formula 3.

Figure 2:
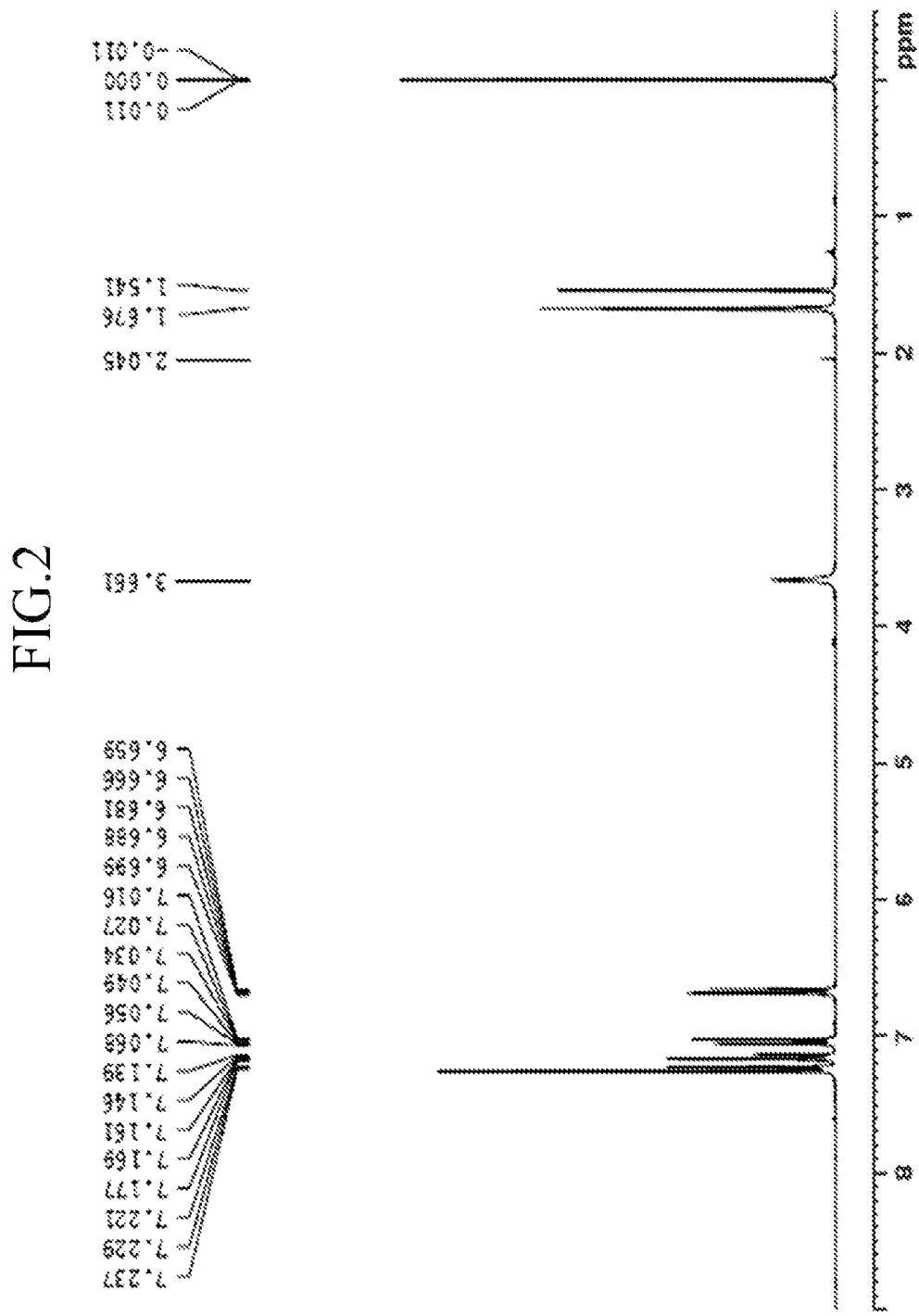
FIG. 2 shows a $^1$H-NMR spectrum of bis(4-aminophenyl) 4,4'-(propan-2,2-diyl)bis(4,1-phenylene)dicarbonate ("DACP-IP") diamine monomer prepared according to Synthesis Example 2.

The final compound is identified regarding the chemical structure through $^1$H-NMR spectrum measured with Bruker NMR spectroscopy. The spectrum is provided in FIG. 2.

1H-NMR (300 MHz, CDCl$_3$): (ppm) 7.23-7.22 (d, 4H, ArH), 7.17-7.13 (d, 4H, ArH), 7.06-7.01 (d, 4H, ArH), 6.69-6.65 (d, 4H, ArH), 3.66 (s, 4H, —NH$_2$), 1.67 (s, 6H, —C(CH$_3$)$_2$—).

EXAMPLE 1

Preparation of Polyamic Acid (1)

2.463 mmol (1.282 g) of the DACP-S according to Synthesis Example 1 is dissolved in 8.5 ml of N-dimethylacetamide ('DMAc'). Then, another solution is prepared by dissolving 2.593 mmol (1.35 g) of 2,2'-bis[4-(3,4-dicarboxyphenoxy)-phenyl]propane dianhydride ("BPADA") in 8.5 ml of N-dimethyl acetamide. The latter solution is slowly added to the former solution. The mixture is reacted at room temperature for 18 hours, preparing polyamic acid.

EXAMPLE 2

Preparation of Polyamic Acid (2)

2.463 mmol (1.394 g) of DACP-IP according to Synthesis Example 2 is dissolved in 20 ml of N-dimethyl acetamide. In addition, 2.593 mmol (1.35 g) of BPADA is dissolved in 8.5 ml of N-dimethyl acetamide. The latter solution is slowly added to the former solution. The resulting mixture is reacted at room temperature for 18 hours, preparing polyamic acid.

EXAMPLES 3 AND 4

Preparation of Polyimide Film

The polyamic acids according to Examples 1 and 2 are respectively coated on a glass substrate and then heat-treated at 50° C. for 1 hour for stabilization.

The resulting material is treated under vacuum at 10$^{-1}$ torr at 80° C. in order to remove the solvent, and then heated to 250° C. at a rate of 6° C./min, maintained at that temperature for 10 minutes and then cooled to room temperature. Next, the 100 μm-thick polyimide film is peeled off from the glass substrate.

The DACP-S-based polyimide and the DACP-IP-based polyimide according to Examples 3 and 4 are analyzed regarding the structure using FT-IR. The analysis spectra are provided in FIGS. 3 and 4, respectively.

Figure 3:
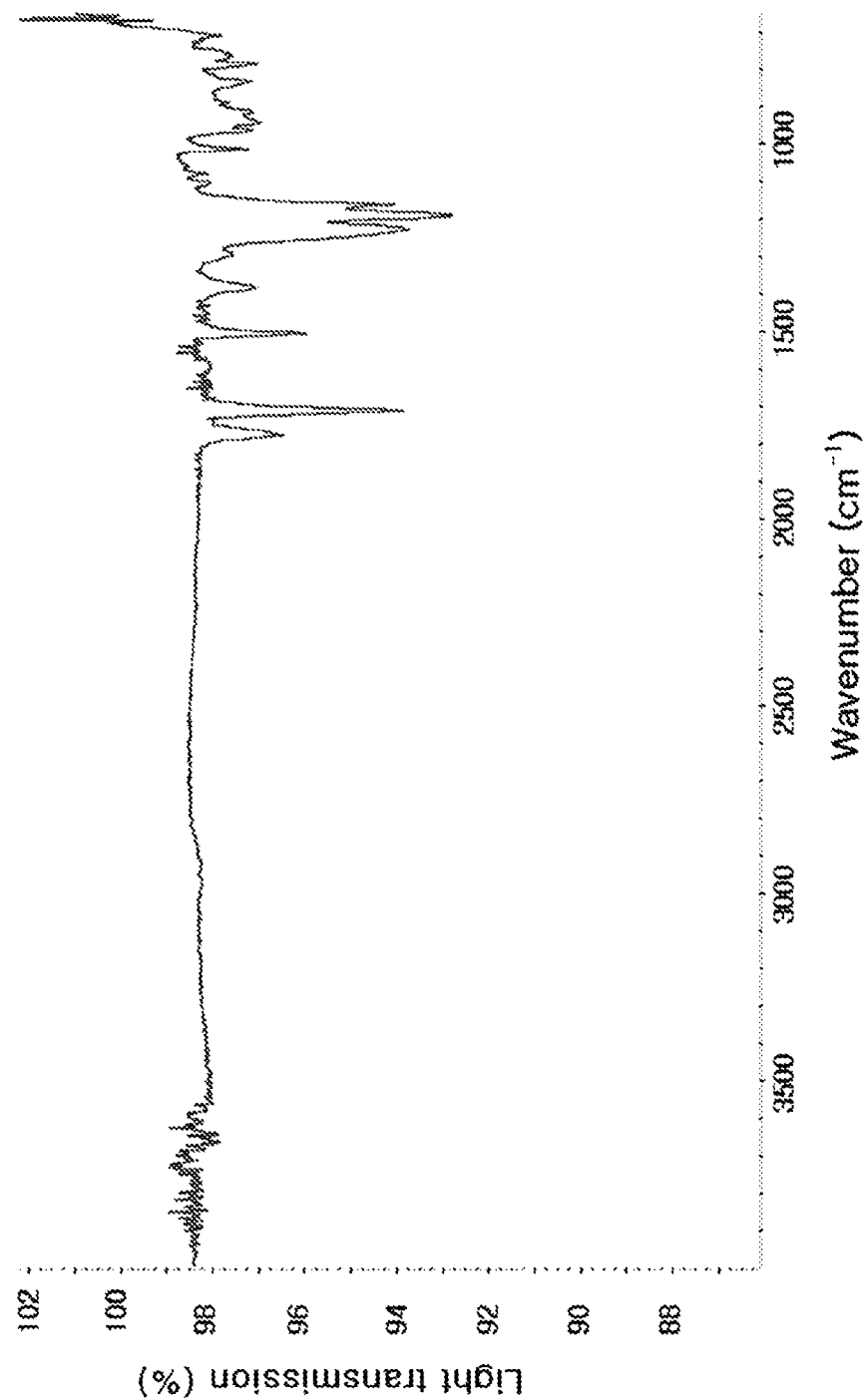
FIGS. 3 and 4 respectively show FT-IR spectra of a polyimide prepared from prepared from DACP-S and 2,2'-bis[4-(3,4-dicarboxyphenoxy)-phenyl]propane dianhydride ("BPADA") and of a polyimide prepared from DACP-IP and BPADA.

Referring to FIG. 3, C═O bands of new carbonyl groups appear at about 1779 and about 1713 cm$^{-1}$. These bands are caused by C═O of an imide produced through reaction of an anhydride with an amine. In particular, bands at about 1380 and about 840 cm$^{-1}$ are sulfonyl (O═S═O) bands.

Figure 4:
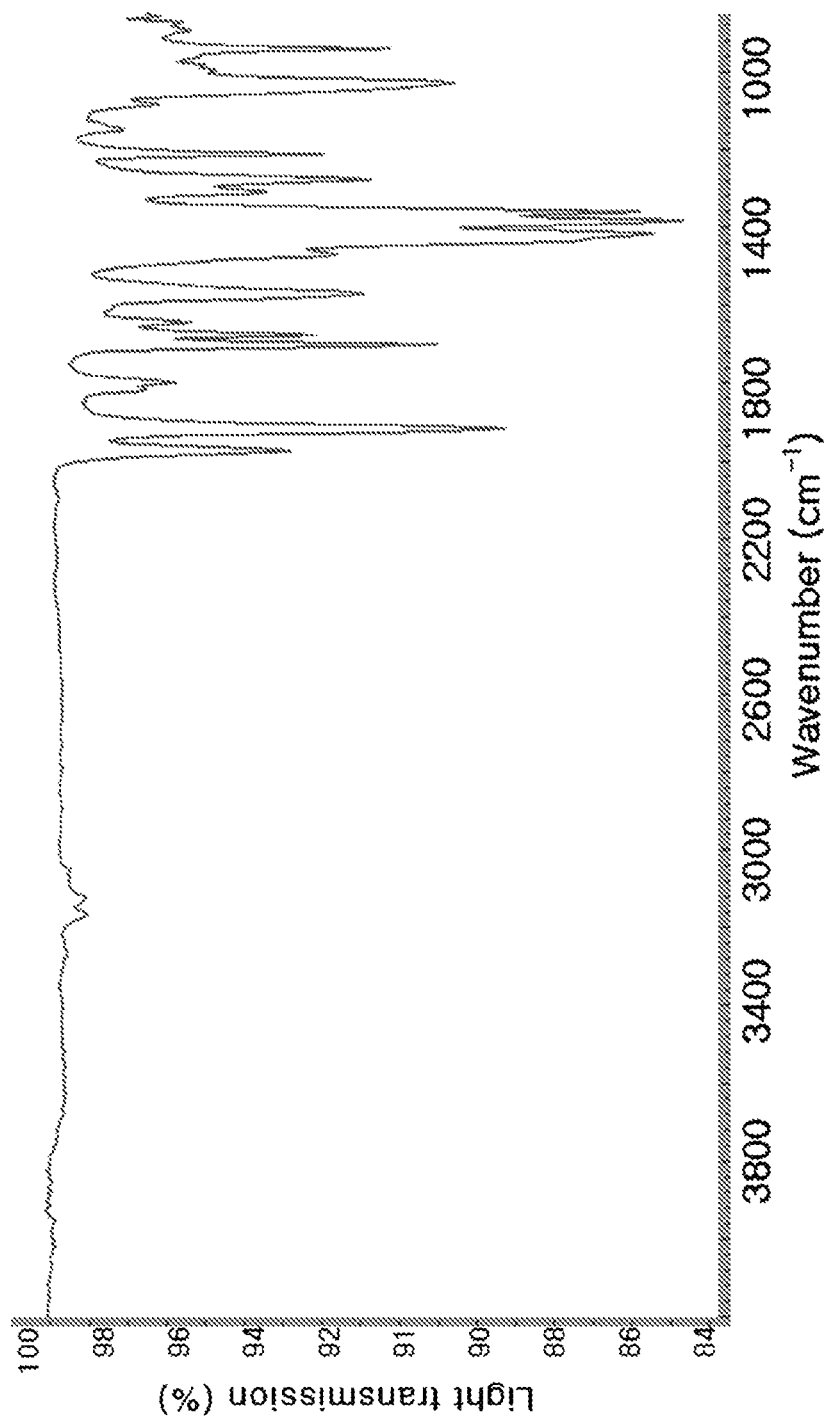

Referring to FIG. 4, C═O bands of new carbonyl groups appear at 1778 and 1719 cm$^{-1}$. These bands are caused by a C═O of an imide produced through reaction of an anhydride Chemical Formula 3

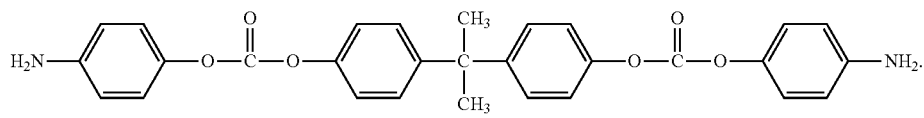

with an amine. Bands appearing at 1385 and 1164 cm$^{-1}$ are caused by a carbonate (—O—C(═O)—O—).

The polyimide films according to Examples 3 and 4 are evaluated for coefficient of thermal expansion ("CTE"), light transmission, yellow index (YI), and phase-retardation ("Ro"). The results provided in Table 1.

TABLE 1

| | Diamine monomer | CTE (ppm/° C.) | Light transmission (%) | Yellow index (YI) | Phase-retardation (Ro, nm) |
|---|---|---|---|---|---|
| Example 3 | DACP-S | 53 | 87 | 6 | <2 |
| Example 4 | DACP-IP | 63 | 85 | 5 | <2 |

A thermal mechanical analyzer ("TMA") is used to measure the coefficient of thermal expansion ("GTE"). The polyimide films according to Examples 3 and 4 exhibit excellent CTE values of 53 ppm/° C. and 63 ppm/° C., respectively. Their light transmission and yellow index ("YI") are measured using a Konica Minolta Spectrophotometer. The polyimide films according to Examples 3 and 4 have total light transmission of 87% and 85%, respectively, showing excellent transmission at a thickness of 100 micrometers. In addition, the polyimide films according to Examples 3 and 4 have a yellow index of 6 and 5, respectively, which demonstrates excellent transparency.

Their phase-retardation is measured using a Universal Polarization Measurement System ELLI-RET-V. The sample has a size of 1×1 inches and a thickness of 100 micrometers. The specimens are put in a sample holder and fixed to be 550 nm with a monocrometer. A refractive index regarding a slow axis (x) (a direction of extending axis) and a fast axis (y) (a direction of an axis orthogonal to the extending axis) is measured in-plane at each angle of incidence, which is changed from −50 degrees to 50 degrees at intervals of 5 degrees. The phase-retardation ("Ro") is calculated from the following Equation 1.

$$Ro = [nx-ny] \times d \qquad \text{Equation 1}$$

In the equation 1, nx indicates a refractive index in the x direction, ny indicates a refractive index in the y direction, and d indicates film thickness.

The phase-retardation ("Ro") results of the polyimide film according to Example 4 are provided in the following Table 2 and FIG. 5.

TABLE 2

| Tilt angle (degree) | Slow axis (x) | Fast axis (y) | Ro (phase-retardation, nm) |
|---|---|---|---|
| 50 | 11.717 | −8.195 | 1.761 |
| 45 | 10.078 | −6.923 | 1.5775 |
| 40 | 8.412 | −5.704 | 1.354 |
| 35 | 6.846 | −4.496 | 1.175 |
| 30 | 5.4 | −3.429 | 0.9855 |
| 25 | 4.092 | −2.469 | 0.8115 |
| 20 | 3.043 | −1.699 | 0.672 |
| 15 | 2.116 | −1.061 | 0.5275 |
| 10 | 1.421 | −0.612 | 0.4045 |
| 5 | 0.919 | −0.35 | 0.2845 |
| 0 | 0.611 | −0.263 | 0.174 |
| −5 | 0.491 | −0.386 | 0.0525 |
| −10 | 0.636 | −0.762 | −0.063 |
| −15 | 0.932 | −1.243 | −0.1555 |
| −20 | 1.501 | −1.984 | −0.2415 |
| −25 | 2.219 | −2.876 | −0.3285 |
| −30 | 3.174 | −3.99 | −0.408 |
| −35 | 4.228 | −5.235 | −0.5035 |
| −40 | 5.552 | −6.666 | −0.557 |
| −45 | 7.025 | −8.277 | −0.626 |
| −50 | 8.642 | −10.047 | −0.7025 |

Figure 5:
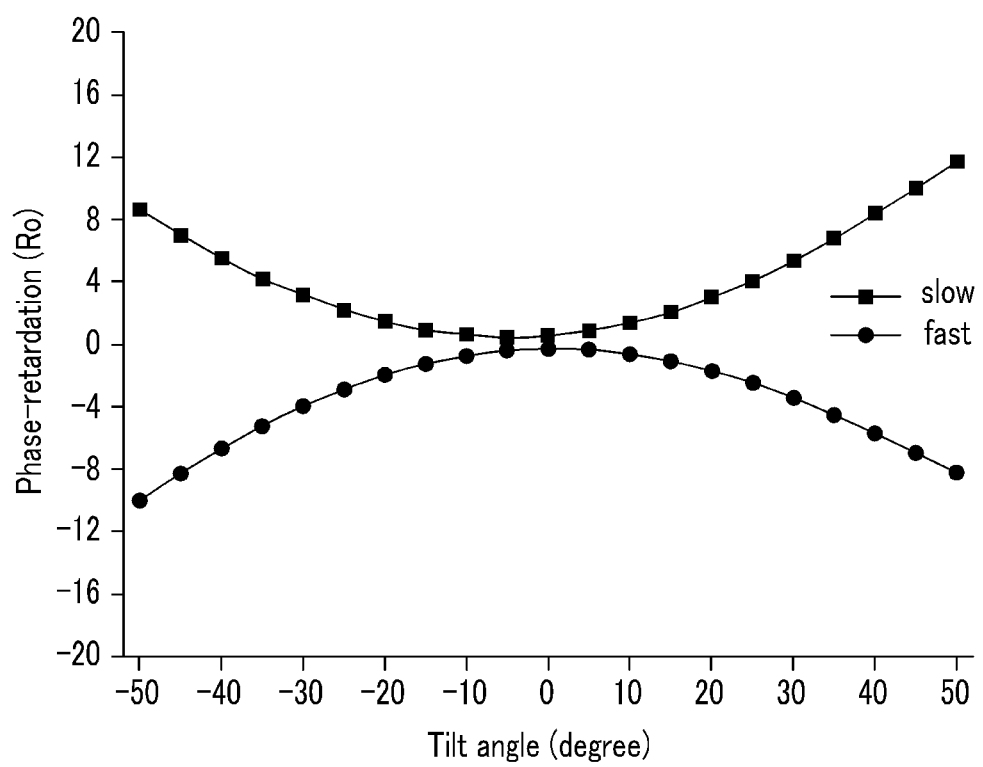
FIG. 5 is a graph of phase retardation (Ro) vs. tilt angle (degree), illustrating the phase-retardation properties of a polyimide prepared according to Example 4.

Referring to Table 2 and FIG. 5, when the polyimide film according to Example 4 are measured regarding phase-retardation according to the above method, they show improved phase-retardation of 2 nm or less up to 50° of tilt angle on the front side with very little optic anisotropy. Accordingly, when they are applied as a liquid crystal display substrate controlling polarized light, they may have an excellent contrast ratio ("C/R") even within a wide tilt range.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyamic acid, wherein the polyamic acid comprises a condensation reaction product of
one or more acid anhydrides and one or more carbonate-based diamine compound represented by the following Chemical Formula 1:

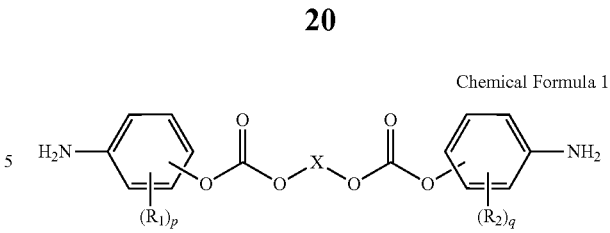

Chemical Formula 1 wherein, in the above Chemical Formula 1, X is a divalent aromatic group represented by the following Chemical Formula 1A or a substituted or unsubstituted divalent C5 to C30 alicyclic group, $R_1$ and $R_2$ are independently a $C_1$ to $C_{10}$ alkyl group, or a $C_1$ to $C_{10}$ fluoroalkyl group, and p and q independently range from 0 to 3,

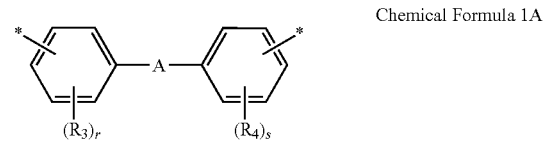

Chemical Formula 1A wherein, in the above Chemical Formula 1A, A is a single bond, CRR' (wherein R and R' are hydrogen, a $C_1$ to $C_{10}$ alkyl group, or a $C_1$ to $C_{10}$ fluoroalkyl group), $SO_2$, O, or CO, each $R_3$ and $R_4$ is independently a $C_1$ to $C_{10}$ alkyl group, or a $C_1$ to $C_{10}$ fluoroalkyl group, and r and s independently range from 0 to 3.

2. The polyamic acid of claim 1, wherein X of the above Chemical Formula 1 is selected from the following Chemical Formulae 1B:

Chemical Formulae 1B

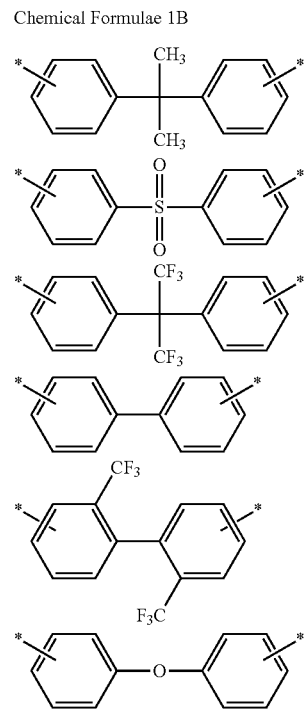

-continued

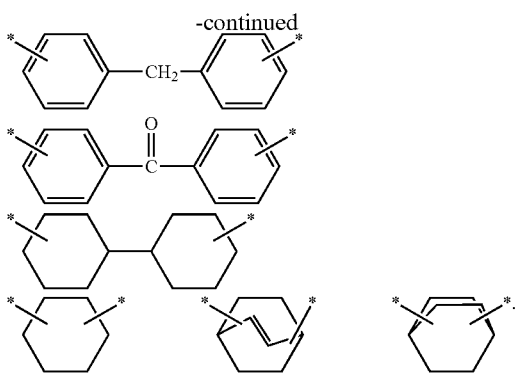

3. The polyamic acid of claim 1, wherein at least one acid anhydride is a compound selected from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

4. The polyamic acid of claim 1, wherein at least one diamine is a compound represented by the following Chemical Formula 3:

5. The polyamic acid of claim 1, wherein at least one diamine is a compound represented by the following Chemical Formula 4:

6. The polyamic acid of claim 1, wherein the polyamic acid comprises a structural unit represented by the following Chemical Formula 6:

wherein, in the above Chemical Formula 6, n ranges from 1 to about 500,000, X, $R_1$, $R_2$, p, and q are the same as in Chemical Formula 1, and Cy is a trivalent or tetravalent organic group derived from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

7. A polyimide, wherein the polyimide is the imidization product of a polyamic acid produced by condensing one or more acid anhydrides and one or more carbonate-based diamine compounds represented by the following Chemical Formula 1:

Chemical Formula 1

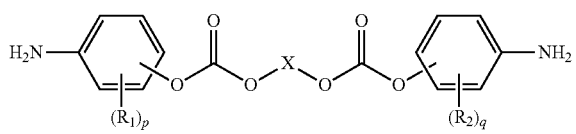

Chemical Formula 3

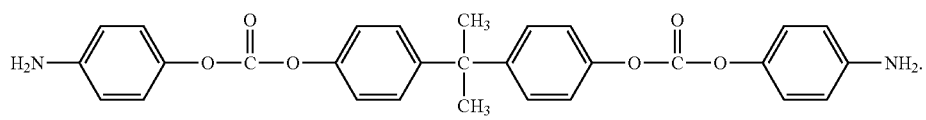

Chemical Formula 4

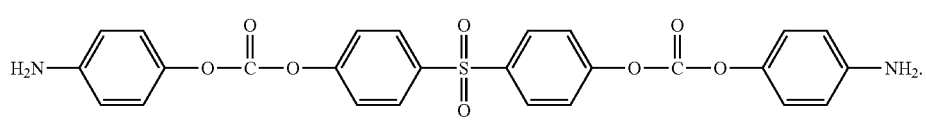

Chemical Formula 6

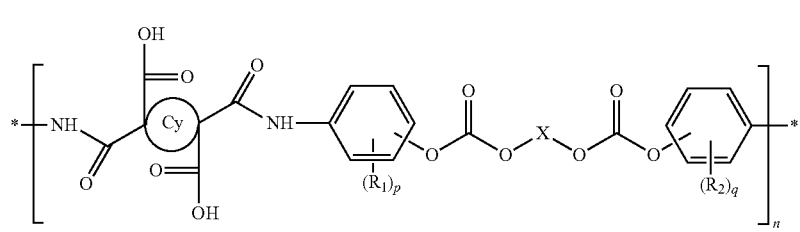

wherein, in the above Chemical Formula 1, X is a divalent aromatic group represented by the following Chemical Formula 1A or a substituted or unsubstituted divalent C5 to C30 alicyclic group, $R_1$ and $R_2$ are independently a $C_1$ to $C_{10}$ alkyl group, or a $C_1$ to $C_{10}$ fluoroalkyl group, and p and q independently range from 0 to 3,

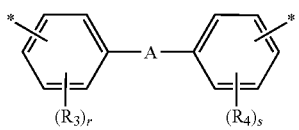

Chemical Formula 1A wherein, in the above Chemical Formula 1A, A is a single bond, CRR' (where R and R' are hydrogen, a $C_1$ to $C_{10}$ alkyl group, or a $C_1$ to $C_{10}$ fluoroalkyl group), $SO_2$, O, or CO, each $R_3$ and $R_4$ is independently a $C_1$ to $C_{10}$ alkyl group, or a $C_1$ to $C_{10}$ fluoroalkyl group, and r and s independently range from 0 to 3.

8. The polyimide of claim 7, wherein X of the above Chemical Formula 1 is selected from the following Chemical Formulae 1B:

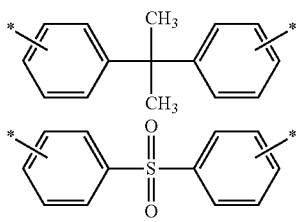

Chemical Formulae 1B

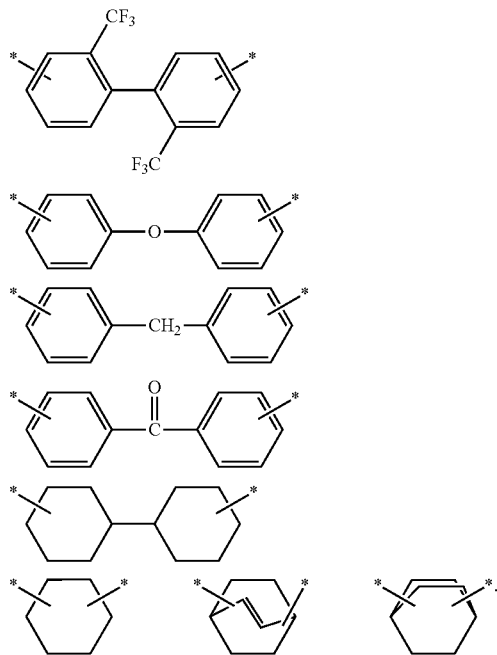

9. The polyimide of claim 7, wherein at least one acid anhydride is a compound selected from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

10. The polyimide of claim 7, wherein the polyimide comprises structural unit represented by the following Chemical Formula 7:

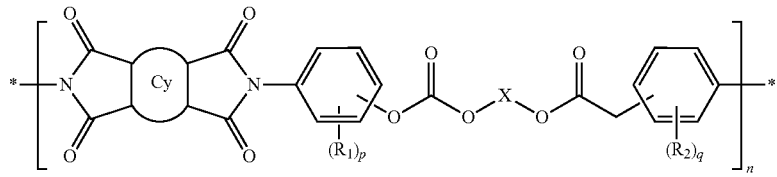

Chemical Formula 7

-continued

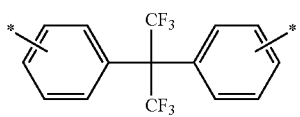

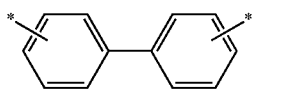

wherein, in the above Chemical Formula 7, n ranges from 1 to about 500,000, X, $R_1$, $R_2$, p, and q are the same as in Chemical Formula 1, and Cy is a trivalent or a tetravalent organic group derived from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

11. The polyimide of claim 7, wherein the polyimide is represented by the following Chemical Formula 8:

Chemical Formula 8

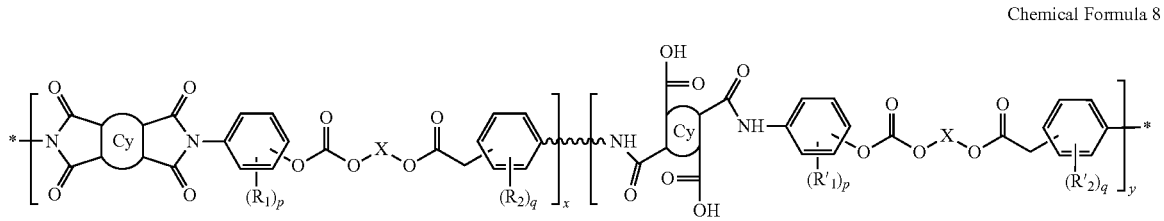

wherein, in the above Chemical Formula 8, n (the sum of x and y) ranges from 1 to about 500,000, x and y are mole ratios wherein x:y ranges from about 0.01:99.99 to about 99.99:0.01, X, $R_1$, $R_2$, p, and q are the same as in Chemical Formula 1, and $R'_1$ and $R'_2$ are the same as $R_1$ and $R_2$ defined in Chemical Formula 1, and Cy is a trivalent or a tetravalent organic group derived from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

12. The polyimide of claim 7, wherein at least one diamine is a compound represented by the following Chemical Formula 3:

Chemical Formula 3

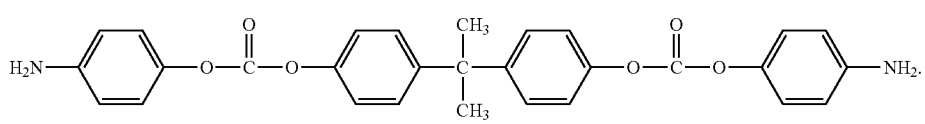

13. The polyimide of claim 7, wherein at least one diamine is a compound represented by the following Chemical Formula 4:

Chemical Formula 4

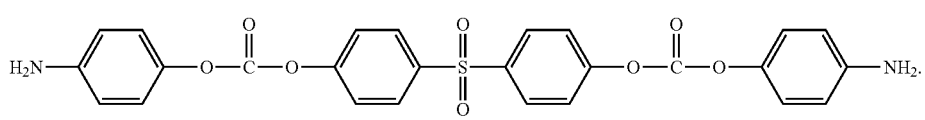

14. The polyimide of claim 7, wherein the polyimide has a weight average molecular weight of about 10,000 to about 2,000,000.

15. A polyimide film comprising a polyimide according to claim 7.

16. A method of preparing a polyimide, comprising:
imidizing a polyamic acid produced by the condensation of one or more acid anhydrides and one or more carbonate-based diamines represented by the following Chemical Formula:

Chemical Formula 1

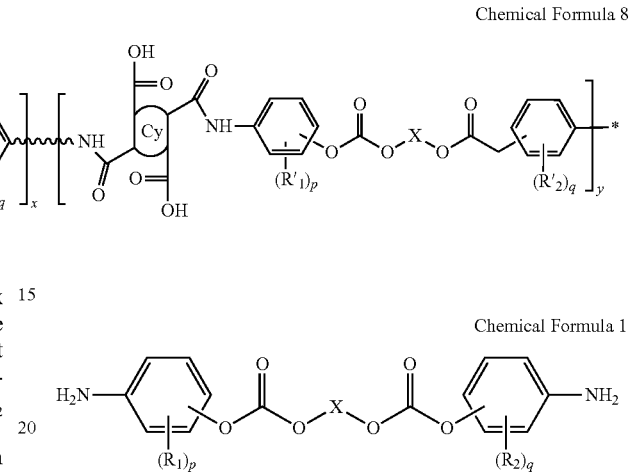

wherein, in the above Chemical Formula 1, X is a divalent aromatic group represented by the following Chemical Formula 1A or a substituted or unsubstituted divalent C5 to C30 alicyclic group, $R_1$ and $R_2$ are independently a $C_1$ to $C_{10}$ alkyl group, or a $C_1$ to $C_{10}$ fluoroalkyl group, and p and q independently range from 0 to 3, Chemical Formula 1A

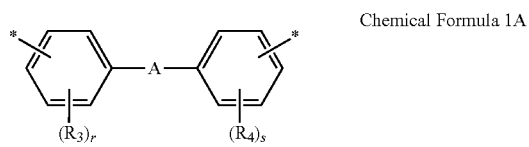

wherein, in the above Chemical Formula 1A, A is a single bond, CRR' (where R and R' are hydrogen, a $C_1$ to $C_{10}$ alkyl group, or a $C_1$ to $C_{10}$ fluoroalkyl group), $SO_2$, O, or CO, each $R_3$ and $R_4$ is independently a $C_1$ to $C_{10}$ alkyl group, or a $C_1$ to $C_{10}$ fluoroalkyl group, and each r and s independently ranges from 0 to 3.

17. The method of claim 16, wherein X of the above Chemical Formula 1 is selected from the following Chemical Formulae 1B:

Chemical Formula 1B

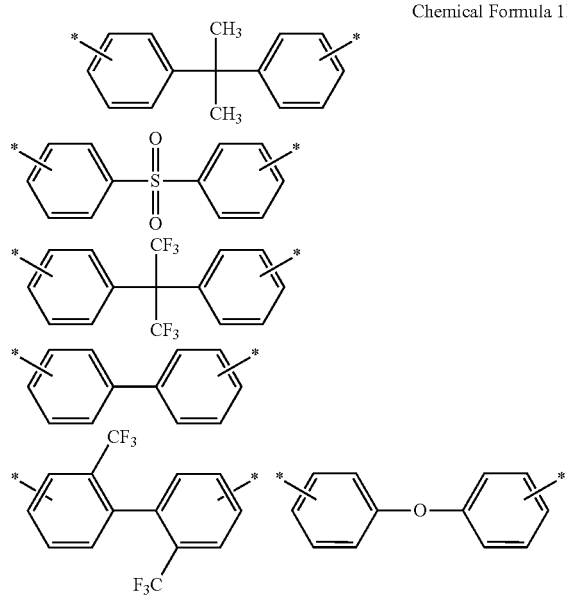

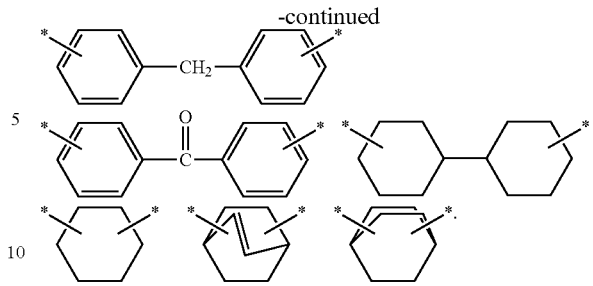

18. The method of claim 16, wherein at least one acid anhydride is a compound selected from 4,4'-biphthalic anhydride, 3,3',4,4'-diphenylsulfone tetracarboxylic dianhydride, 3,3',4,4'-benzophenonetetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and 4,4'-bisphenol A dianhydride.

19. The method of claim 16, wherein the one or more carbonate-based diamine compounds are used in an amount of about 0.5 moles to about 1.5 moles based on 1 mole of the acid anhydride.

20. The method of claim 16, wherein condensing is performed at about 0° C. to about 200° C.

21. The method of claim 16, wherein imidizing is performed at about 100° C. to about 400° C.

* * * * *